United States Patent
B S (10) Patent No.: US 10,942,758 B2
(45) Date of Patent: Mar. 9, 2021

(54) MIGRATING VIRTUAL HOST BUS ADAPTORS BETWEEN SETS OF HOST BUS ADAPTORS OF A TARGET DEVICE IN ORDER TO REALLOCATE BANDWIDTH TO ENABLE VIRTUAL MACHINE MIGRATION

(71) Applicant: HEWLETT PACKARD ENTERPRISE DEVELOPMENT LP, Houston, TX (US)

(72) Inventor: Sumangala B S, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 198 days.

(21) Appl. No.: 15/489,718

(22) Filed: Apr. 17, 2017

(65) Prior Publication Data
US 2018/0300164 A1 Oct. 18, 2018

(51) Int. Cl.
*G06F 9/455* (2018.01)
*G06F 9/48* (2006.01)
(Continued)

(52) U.S. Cl.
CPC ........ *G06F 9/45558* (2013.01); *G06F 9/4856* (2013.01); *G06F 9/5077* (2013.01);
(Continued)

(58) Field of Classification Search
CPC .. G06F 9/45558; G06F 9/4856; G06F 3/0647; G06F 2009/4557; H04L 67/1097
See application file for complete search history.

(56) References Cited

U.S. PATENT DOCUMENTS 7,990,994 B1 * 8/2011 Yeh ..................... H04L 12/4641
370/431
8,923,328 B2 12/2014 Kanda et al.
(Continued)

OTHER PUBLICATIONS

Roblyer, K. et al., Allocating Bandwidth Dynamically for Quality of Service Delivery, (Research Paper), 2012, 3 Pgs.
(Continued)

*Primary Examiner* — Meng Ai T An
*Assistant Examiner* — Michael W Ayers
(74) *Attorney, Agent, or Firm* — Hewlett Packard Enterprise Patent Department (57) ABSTRACT

Examples provided herein describe a system and method for migrating virtual machines. For example, a target hypervisor of a target device may determine whether bandwidth exists on the target device to migrate a source set of virtual machines from a source device. The target hypervisor may determine whether bandwidth exists by: determining whether a source total amount of bandwidth is less than an available target total amount of bandwidth on the target set of host bus adaptors; and, responsive to determining that the source total amount of bandwidth is less than the available target total amount of bandwidth, moving a first target virtual host bus adaptor of the target set of virtual machines across the target set of host bus adaptors to make available the source total amount of bandwidth to migrate the source set of virtual machines. Responsive to determining that the source total amount of bandwidth exists, the source set of virtual machines may be migrated to the target device.

20 Claims, 3 Drawing Sheets

(51) Int. Cl.
 *G06F 9/50* (2006.01)
 *H04L 29/08* (2006.01)

(52) U.S. Cl.
 CPC .... *G06F 9/5027* (2013.01); *G06F 2009/4557* (2013.01); *H04L 67/1097* (2013.01)

(56) References Cited

U.S. PATENT DOCUMENTS

| | | | |
|---|---|---|---|
| 9,264,384 B1 | 2/2016 | Sundaresan et al. | |
| 9,672,054 B1* | 6/2017 | Gupta | G06F 9/45533 |
| 2004/0122938 A1* | 6/2004 | Messick | H04L 29/06 |
| | | | 709/224 |
| 2007/0186025 A1* | 8/2007 | Boyd | G06F 9/5077 |
| | | | 710/305 |
| 2009/0327781 A1* | 12/2009 | Tripathi | G06F 9/4818 |
| | | | 713/324 |
| 2011/0110381 A1* | 5/2011 | Atkinson | H04L 47/125 |
| | | | 370/419 |
| 2011/0154318 A1 | 6/2011 | Oshins et al. | |
| 2011/0231843 A1* | 9/2011 | Shimogawa | G06F 9/5088 |
| | | | 718/1 |
| 2013/0007254 A1 | 1/2013 | Fries | |
| 2013/0086298 A1* | 4/2013 | Alanis | G06F 9/4856 |
| | | | 711/6 |
| 2014/0108776 A1* | 4/2014 | Miyauchi | G06F 9/45558 |
| | | | 713/2 |
| 2014/0208315 A1 | 7/2014 | Abali et al. | |
| 2015/0169337 A1* | 6/2015 | Abali | G06F 9/5088 |
| | | | 718/1 |
| 2015/0205542 A1* | 7/2015 | Antony | G06F 9/45558 |
| | | | 711/162 |
| 2016/0019078 A1 | 1/2016 | Challa et al. | |
| 2016/0019176 A1* | 1/2016 | Challa | G06F 9/45558 |
| | | | 710/117 |
| 2016/0203027 A1* | 7/2016 | Challa | G06F 9/5038 |
| | | | 718/1 |
| 2017/0039079 A1 | 2/2017 | Nambiar et al. | |

OTHER PUBLICATIONS

Singh A et al: "Server-storage virtualization: Integration and load balancing in data centers", Nov. 15, 2008, pp. 1-12.

\* cited by examiner

```
400 DETERMINE WHETHER BANDWIDTH EXISTS ON A TARGET DEVICE TO MIGRATE A
SOURCE SET OF VIRTUAL MACHINES FROM A SOURCE DEVICE

410 DETERMINE WHETHER A SOURCE TOTAL AMOUNT OF BANDWIDTH
    RELATED TO THE SOURCE SET OF VIRTUAL MACHINES IS LESS THAN AN
    AVAILABLE TARGET AMOUNT OF FREE BANDWIDTH ON A TARGET SET OF
    HOST BUS ADAPTORS
                                    ↓
    420 RESPONSIVE TO DETERMINING THAT THE SOURCE TOTAL AMOUNT OF
    BANDWIDTH IS LESS THAN THE AVAILABLE TARGET TOTAL AMOUNT OF
    BANDWIDTH, MOVE A FIRST TARGET VIRTUAL HOST BUS ADAPTOR ACROSS
    THE TARGET SET OF HOST BUS ADAPTORS TO MAKE AVAILABLE THE
    SOURCE TOTAL AMOUNT OF BANDWIDTH TO MIGRATE THE SOURCE SET OF
    VIRTUAL MACHINES
                                    ↓
430 RESPONSIVE TO DETERMINING THAT THE SOURCE TOTAL AMOUNT OF
BANDWIDTH EXISTS, MIGRATE THE SOURCE SET OF VIRTUAL MACHINES TO THE
TARGET DEVICE
```

FIG. 5

```
500 DETERMINE WHETHER A CORRESPONDING AMOUNT OF BANDWIDTH EXISTS
ON EACH OF A CORRESPONDING TARGET SET OF HOST BUS ADAPTORS FOR A ONE-
TO-ONE MIGRATION OF THE SOURCE SET OF VIRTUAL MACHINES
                                ↓
510 PERFORM THE ONE-TO-ONE MIGRATION RESPONSIVE TO DETERMINING THE
BANDWIDTH EXISTS
                                ↓
520 DETERMINE THAT THE SOURCE TOTAL AMOUNT OF BANDWIDTH IS LESS THAN
THE AVAILABLE TARGET TOTAL AMOUNT OF BANDWIDTH RESPONSIVE TO
DETERMINING THAT THE CORRESPONDING AMOUNT OF BANDWIDTH DOES NOT
EXIST FOR THE ONE-TO-ONE MIGRATION
```

MIGRATING VIRTUAL HOST BUS ADAPTORS BETWEEN SETS OF HOST BUS ADAPTORS OF A TARGET DEVICE IN ORDER TO REALLOCATE BANDWIDTH TO ENABLE VIRTUAL MACHINE MIGRATION

BACKGROUND

A server or other physical device may support a plurality of virtual machines. The virtual machines of the server may need to be migrated to new server or physical device, due to hardware failure of the initial server, enrollment of new services being provided, a change or new allotment of resources, and/or other reasons. The migration of the plurality of virtual machines may fail due to a lack of bandwidth for the virtual machines at the new server or physical device.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The foregoing disclosure describes a number of example implementations for migrating virtual machines. The disclosed examples may include systems, devices, computer-readable storage media, and methods for migrating virtual machines. For purposes of explanation, certain examples are described with reference to the components illustrated in FIGS. 1-5. The functionality of the illustrated components may overlap, however, and may be present in a fewer or greater number of elements and components.

Figure 4:
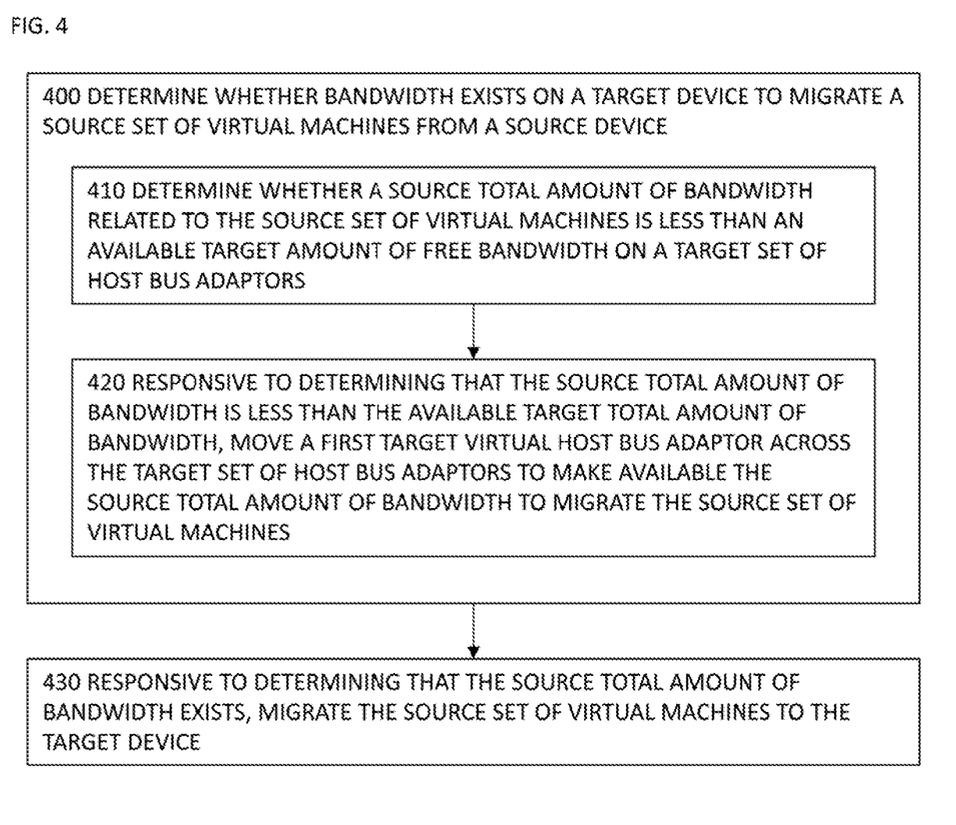
FIG. 4 is a block diagram depicting an example machine-readable storage medium comprising instructions executable by a processor for migrating virtual machines.
Figure 5:
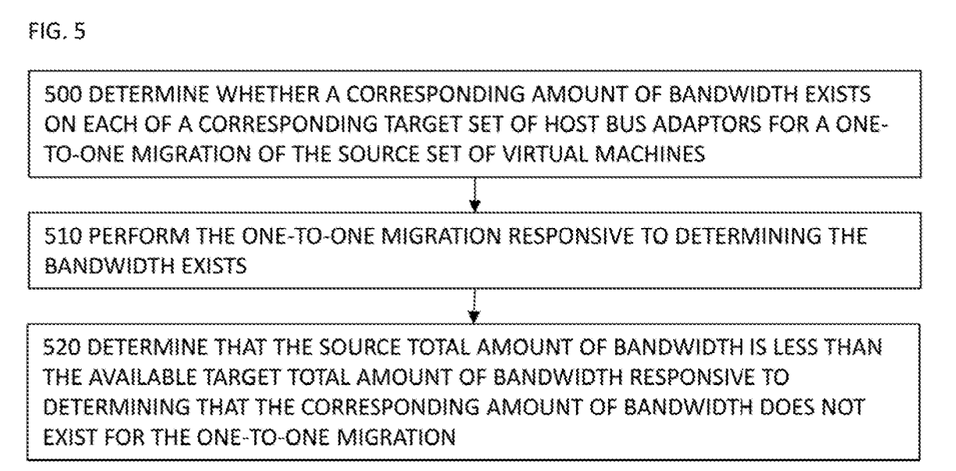
FIG. 5 is a flow diagram depicting an example method for migrating virtual machines.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 4-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

A server or other physical device may support a plurality of virtual machines. The virtual machines of the server may need to be migrated to new server or physical device, due to hardware failure of the initial server, enrollment of new services being provided, a change or new allotment of resources, and/or other reasons. The migration of the plurality of virtual machines may fail due to a lack of bandwidth for the virtual machines at the new server or physical device.

For example, to migrate a set of virtual machines from a source device to a target device, a target hypervisor of the target device may determine whether enough bandwidth is available on target system host bus adaptors of the target device for a one-to-one migration of the set of virtual machines. In particular, the target hypervisor may determine whether the bandwidth available on the target system host bust adaptors could facilitate migration of the set of virtual machines such that each virtual machine being migrated used the same bandwidth on the target device as on the source device. Migration of the set of virtual machines may fail even if the total bandwidth available across host bus adaptors on target is equal to or greater than bandwidth required by the set of virtual machines of the source device, because there is not available bandwidth in the exact 1:1 proportion used by the source set of virtual machines on the source device.

These limitations of requiring a one-to-one migration of virtual machines to virtual host bus adaptors from a source device to a target device negatively affects the ability to migrate virtual machines. In some examples, failure recovery, allocation of services via cloud providers, and other functionalities that require the migration of virtual machines may be affected as well.

Examples discussed herein address these technological issues by providing a system and method for migrating virtual machines. For example, a target hypervisor of a target device may determine whether bandwidth exists on the target device to migrate a source set of virtual machines from a source device. The target hypervisor may determine whether bandwidth exists by: determining whether a source total amount of bandwidth is less than an available target total amount of bandwidth on the target set of host bus adaptors; and, responsive to determining that the source total amount of bandwidth is less than the available target total amount of bandwidth, moving a first target virtual host bus adaptor of the target set of virtual machines across the target set of host bus adaptors to make available the source total amount of bandwidth to migrate the source set of virtual machines. Responsive to determining that the source total amount of bandwidth exists in the target device, the source set of virtual machines may be migrated to the target device.

Figure 1:
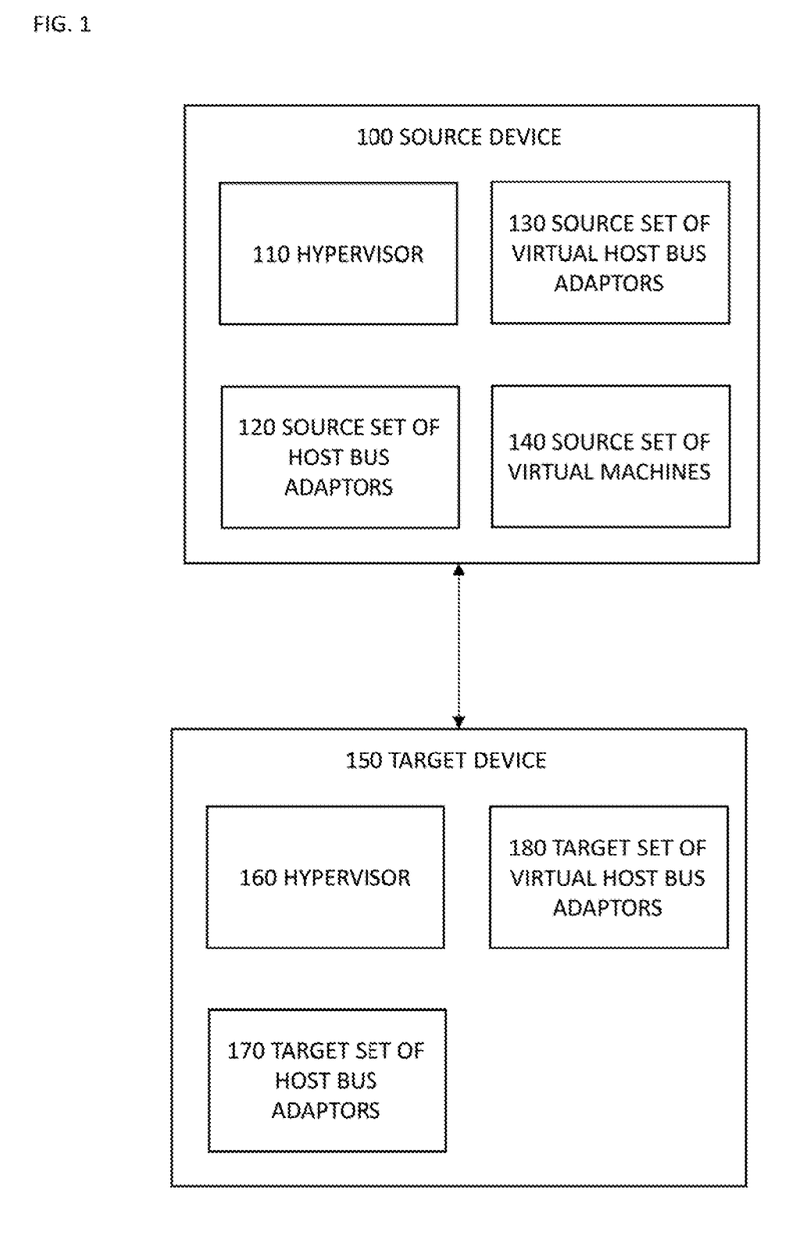
FIG. 1 is a block diagram depicting an example environment in which various examples may be implemented as a system that migrates virtual machines.

FIG. 1 is an example environment in which various examples may be implemented as a system that migrates virtual machines. In some examples, a system that migrates virtual machines may include various components such as a source computing device and a target computing device. Each computing device (e.g., computing device 100 or computing device 150) may communicate to and/or receive data from the other computing device, and/or other components in a network. A computing device may comprise a server, a laptop computing device, a desktop computing device, an all-in-one computing device, a web server, a cloud server, a mainframe, a storage card, and/or other hardware device that comprises a physical processor that implements machine readable instructions to perform functionality.

In some examples, the computing device may host a virtual machine from which data is backed up or to which data is recovered. For example, each computing device 100, 150 may comprise a hypervisor (e.g., hypervisor 110, 160, respectively) that facilitates the creation and use of a set of virtual machines (e.g., virtual machines 130, 180) that are associated with a set of virtual host bus adaptors and hosted by a set of physical host bus adaptors (e.g., host bus adaptors 120, 170). A hypervisor may comprise hardware or firmware that facilitates the creation and management of virtual machines on a computing device. A physical host bus adaptor may comprise hardware (e.g., a circuit board, integrated circuit adaptor, and/or other hardware) that provides I/O processing and connectivity between two computing devices. For example, a physical host bus adaptor may provide I/O processing and connectivity between a host computing device and a destination storage device or destination network device. In some examples, a physical host bus adaptor may comprise multiple virtual host bus adaptors that perform the same functionality as the physical host bus adaptor. The physical host bus adaptor may manage a separate logical port associated with each virtual host bus adaptor. A virtual machine managed by the hypervisor may use resources of one or multiple of the physical host bus adaptors and their corresponding virtual host bus adaptors.

The hypervisor (e.g., hypervisor 110, 160, respectively) may manage the associations between a physical host bus adaptor (e.g., host bus adaptor 120, 170) and a set of virtual host bus adaptors (e.g., virtual host bus adaptors 130, 180) associated with the host bus adaptor. The hypervisor (e.g., hypervisor 110, 160, respectively) may use N-Port ID virtualization ("NPIV") to manage the associations. NPIV comprises a Fiber Channel standard that allows multiple virtual host bus adaptors to be created and used on a single host bus adaptors. Each virtual host bus adaptor may be associated with the single physical host bus adaptor by a unique port and unique node world wide name. Each virtual host bus adaptor may also be allocated a respective amount of bandwidth at the single physical host bus adaptor with which it is associated. For example, the amount of bandwidth may comprise Further, each virtual host bus adaptor may be assigned to a unique virtual machine. The host bus adaptors (e.g., host bus adaptors 120, 170) may comprise any adaptor that facilitates a migration of virtual host bus adaptors. In some examples, the host bus adaptors (e.g., host bus adaptors 120, 170) may comprise any adaptor that is NPIV-capable.

As such, migrating a source set of virtual machines from a source device 100 to a target device 150 may comprise transferring the set of virtual host bus adaptors 130 from the set of physical host bus adaptors 120 of the source device 100 to a set of physical host bus adaptors 160 of the target device 150. To facilitate migration, the source device 100 may send a request to the target device 150 to request migration of the source set of virtual machines 140, the source device 100 and target device 150 may receive a command from another device (e., a cloud server and/or other device) to migrate the source set of virtual machines 140 to the target device 150, and/or the initiation of the migration may be prompted in another manner.

Responsive to the target device 150 determining that a migration of the source set of virtual machines 140 is to occur, a target hypervisor 160 of the target device may determine whether a target total amount of bandwidth available at the target set of host bus adaptors 170 is greater than a source total amount of bandwidth required by the virtual host bus adaptors 120 associated with the source set of virtual machines 140. The target hypervisor 110 may obtain the source total amount of bandwidth required from a request from the source device 100 to migrate, from another device in the network comprising the source device 100 and the target device 150, by pinging the source device 100, and/or in another manner. The target hypervisor 150 may determine the target total amount of bandwidth from information stored in a data storage communicably coupled to the target device 100 and which holds information about the associations between virtual host bus adaptors 170 and the physical host bus adaptors 160 of the target device 100. In some examples, the target hypervisor 150 may also determine an allocation of bandwidth needed by each virtual host bus adaptor 130 at a source set of host bus adaptors 120.

Responsive to determining that the source total amount of bandwidth is greater than the target total amount of bandwidth, the target hypervisor 160 may determine that the migration may fail. As such, the target hypervisor 160 may provide information regarding the failure of the migration.

Responsive to determining that the source total amount of bandwidth is equal to or less than the target amount of bandwidth available at the target device, the target device 150 may proceed with the migration of the source set of virtual machines 140. The target hypervisor 160 may determine whether a one-to-one migration of the source set of virtual machines 140 is possible. For example, the target hypervisor 160 may determine whether the allocation needed for each virtual host bus adaptor 130 is available from a corresponding target set of host bus adaptors 160. Responsive to the allocation being available, the target hypervisor 160 may determine that the one-to-one migration is possible and may cause the one-to-one migration of the source set of virtual machines 130 to the target device 150.

Responsive to determining that the allocation is not available, the target hypervisor 160 may determine an allocation of the target set of virtual host bus adaptors 180 across the target set of host bus adaptors 170 that makes available a respective amount of bandwidth on the target set of host bus adaptors 170 for each of the source host bus adaptors 130 and their associated virtual machines 140. In some examples, the target hypervisor 160 may determine the allocation by re-arranging the associations of virtual host bus adaptors 180 with physical host bus adaptors 170. In some examples, the target hypervisor 160 may transfer a virtual host bus adaptor 180 from a first physical host bus adaptor 170 to a second physical host bus adaptor 170, may create a new virtual host bus adaptors 180 at a first physical host bus adaptor, and/or may otherwise determine a new association of virtual host bus adaptors 180 to physical host bus adaptors 170 to facilitate an allocation of bandwidth needed for the source set of virtual host bus adaptors 130. Responsive to determining an allocation of the target set of virtual host bus adaptors 180 across the target set of host bus adaptors 170 that makes available the respective amount of bandwidth needed on the target set of host bus adaptors 170 for each of the source host bus adaptors 130, the target hypervisor 160 may cause the migration of the source set of virtual machines 140.

In some examples, the target hypervisor 160 may cause the migration by issuing an input/output control to I/O drivers that claim the host bus adaptors 170 and/or virtual host bus adaptors 180.

An example of how the target hypervisor 160 may determine the allocation of associations between the virtual host bus adaptors 180 and the host bus adaptors 170 to facilitate bandwidth for the migration of the source set of virtual machines 140 is shown through example Tables 1-3. Table 1 shows a set of associations between an example source device 100 that may comprise two source virtual host bus adaptors 130 and two physical host bus adaptors 120 on a source device 100 that wants to migrate its source set of virtual machines 140 to the target device 150. For each host bus adaptor, the table includes information about an amount of bandwidth of the virtual host bus adaptors that a virtual machine uses to function. In some examples, the amount of bandwidth represents a capacity amount of processing power of the virtual host bus adaptor, a network bandwidth available to the virtual host bus adaptor, and/or other metric associated with performance of the virtual host bus adaptor. In some examples, the bandwidth may be allocated during creation of virtual host bus adaptors on a physical host bus adaptors that supports bandwidth allocation for virtual host bus adaptors. As mentioned above, the target hypervisor 160 may comprise a set of user supplied spare WWNs which may be used for creating new virtual host bus adaptors that function along with the existing virtual host bus adaptors.

While the table indicates percentage bandwidth used, other metrics (e.g., amount of bandwidth left, ratio, etc.) could also be used in determining how to allocate virtual host bus adaptors during migration.

TABLE 1

| Source Device | Host Bus Adaptor 1 | Host Bus Adaptor 2 |
|---|---|---|
| VM1 | 75% (VHBA1) | |
| VM2 | | 50% (VHBA1) |

Table 2 shows a set of existing associations between an example target device 150 that may comprise two target virtual host bus adaptors 180 and four physical host bus adaptors 170 on a target device 150 to migrate the source set of virtual machines 140.

TABLE 2

| Target Device | HBA 1 | HBA 2 | HBA 3 | HBA 4 |
|---|---|---|---|---|
| (VM1) | 25% (VHBA1) | 12% (VHBA2) | 37% (VHBA3) | 25% (VHBA4) |
| VM2 | 50% (VHBA1) | 50% (VHBA2) | 25% (VHBA3) | |

Table 3 shows a set of new associations between an example target device 150 that may comprise two target virtual host bus adaptors 180 and the source set of virtual host bus adaptors 130 and four physical host bus adaptors 170 on a target device 150 to migrate the source set of virtual machines 140. As shown in Table 3, the target hypervisor 160 may have moved the 25% of bandwidth allocated to the first virtual host bus adaptor from the first physical host bus adaptor to the third host bus adaptor in order to make available bandwidth allocation for the source set of virtual host bus adaptors 130. The new allocations of the virtual host bus adaptors 180 to the physical host bus adaptors 170 may be stored and virtual machines may be migrated from the source device 100 to the target device 150. In some examples, the target hypervisor 160 may comprise a set of user supplied spare WWNs which may be used for creating new virtual host bus adaptors during the process of migrating the source set of virtual host bus adaptors 130. The migration of the source set of virtual machines 140 may comprise associating the source set of virtual machines with their corresponding virtual host bus adaptors 180 and storing those associations in the target device 150.

TABLE 3

| Target Device | HBA 1 | HBA 2 | HBA 3 | HBA 4 |
|---|---|---|---|---|
| VM1 (target VM1) | | 12% (VHBA2) | 25% (VHBA1) 37% (VHBA3) | 25% (VHBA3) |
| VM2 (target VM2) | 50% (VHBA1) | 50% (VHBA2) | 25% (VHBA3) | |
| Source VM1 (Target VM3) | 50% (VHBA1) | | | 25% |
| Source VM2 (Target VM4) | | | | 50% (VHBA1) |

In some examples, the hypervisor (e.g., hypervisor 110, 160) may comprise a physical processor that implements machine readable instructions that perform the functionality described herein.

According to various implementations, a system that migrates virtual machines and the various components described herein may be implemented in hardware and/or a combination of hardware and programming that configures hardware. Furthermore, in FIG. 1 and other Figures described herein, different numbers of components or entities than depicted may be used.

Figure 2:
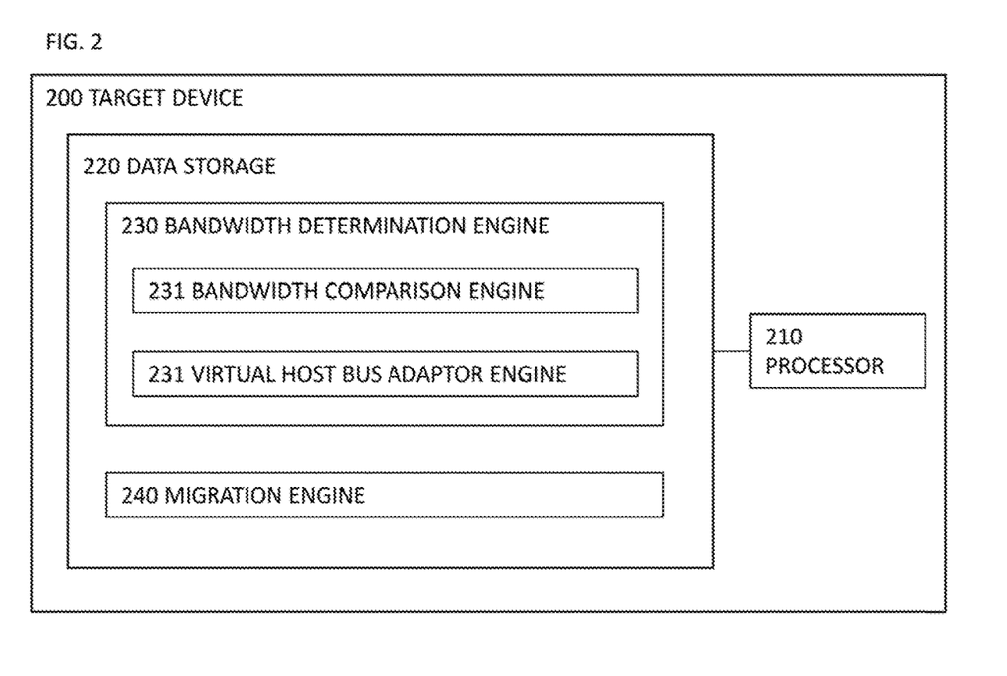
FIG. 2 is a block diagram depicting an example device for migrating virtual machines.

FIG. 2 is a block diagram depicting an example computing device for migrating virtual machines. In some examples, the example computing device 200 may comprise the computing device 150 of FIG. 1. Computing device 200 may comprise a physical processor 210, a data storage 220, a bandwidth determination engine 230, a virtual machine migration engine 240, and/or other engines. In some examples, bandwidth determination engine 230 may comprise bandwidth comparison engine 231, virtual host bus adaptor engine 232, and/or other engines. The term "engine", as used herein, refers to a combination of hardware and programming that performs a designated function. As is illustrated with respect to FIG. 3, the hardware of each engine, for example, may include one or both of a physical processor and a machine-readable storage medium, while the programming is instructions or code stored on the machine-readable storage medium and executable by the processor to perform the designated function.

Bandwidth determination engine 230 may determine whether bandwidth exists on the target device to migrate a source set of virtual machines from a source device. For example, the target device 150 may determine whether bandwidth exists. The target device 150 may determine whether bandwidth exists in a manner similar or the same as that described above in relation to the functionality described above in relation to the target device 150.

In some examples, bandwidth determination engine 230 may comprise bandwidth comparison engine 231, virtual host bus adaptor 232, and/or other engines.

Bandwidth comparison engine 231 may determine whether a source total amount of bandwidth related to the source set of virtual machines is less than an available target total amount of free bandwidth on a target set of host bus adaptors. For example, the target device 150 may compare the source total amount of bandwidth and the target total amount of bandwidth. The target device 150 may compare the source total amount of bandwidth and the target total amount of bandwidth in a manner similar or the same as that described above in relation to the functionality described above in relation to the target device 150.

Virtual host bus adaptor 232 may move, responsive to determining that the source total amount of bandwidth is less than the available target total amount of bandwidth, a first target virtual host bus adaptor of the target set of virtual host bus adaptors across the target set of host bus adaptors to make available the source total amount of bandwidth to migrate the source set of virtual machines. The target device 150 may move the first target virtual host bus adaptor in a manner similar or the same as that described above in relation to the functionality described above in relation to the target device 150.

Virtual machine migration engine 240 may migrate the source set of virtual machines to the target device responsive to determining that the target total amount of bandwidth exists. The target device 150 may migrate the source set of virtual machines in a manner similar or the same as that described above in relation to the functionality described above in relation to the target device 150.

Data storage 220 may include a database to organize and store data. The database may reside in a single or multiple physical device(s) and in a single or multiple physical location(s). The data storage 220 may store information about physical host bus adaptors, virtual host bus adaptors, virtual machines, associations therebetween, and/or any other data.

Figure 3:
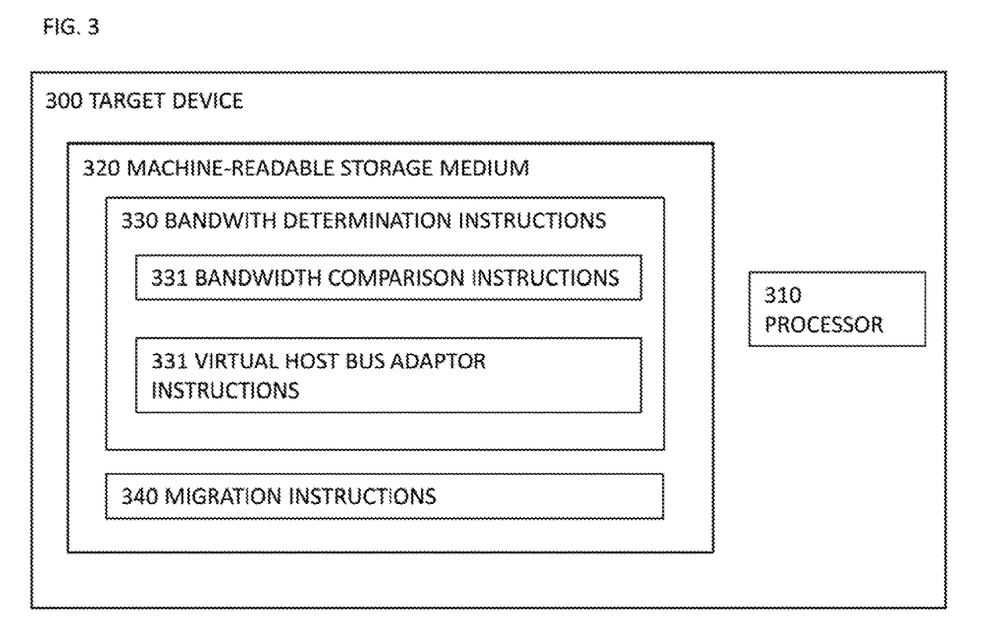
FIG. 3 is a block diagram depicting an example machine-readable storage medium comprising instructions executable by a processor for migrating virtual machines.

FIG. 3 is a block diagram depicting an example machine-readable storage medium 310 comprising instructions executable by a processor for migrating virtual machines.

In the foregoing discussion, engines 230-240 were described as combinations of hardware and programming. Engines 230-240 may be implemented in a number of fashions. Referring to FIG. 3, the programming may be processor executable instructions 330-340 stored on a machine-readable storage medium 320 and the hardware may include a processor 320 for executing those instructions. Thus, machine-readable storage medium 320 can be said to store program instructions or code that when executed by processor 310 implements a computing device that migrates virtual machines of FIG. 1.

In FIG. 3, the executable program instructions in machine-readable storage medium 310 are depicted as bandwidth determination instructions 330, migration instructions 340, and/or other instructions. Bandwidth determination instructions may comprise bandwidth comparison instructions 331, virtual host bus adaptor instructions 332, and/or other instructions. Instructions 330-340 represent program instructions that, when executed, cause processor 310 to implement engines 230-240, respectively.

Machine-readable storage medium 320 (or machine-readable storage medium 420) may be any electronic, magnetic, optical, or other physical storage device that contains or stores executable instructions. In some implementations, machine-readable storage medium 320 may be a non-transitory storage medium, where the term "non-transitory" does not encompass transitory propagating signals. Machine-readable storage medium 320 may be implemented in a single device or distributed across devices. Likewise, processor 310 may represent any number of physical processors capable of executing instructions stored by machine-readable storage medium 320. Processor 310 may be integrated in a single device or distributed across devices. Further, machine-readable storage medium 320 may be fully or partially integrated in the same device as processor 310, or it may be separate but accessible to that device and processor 310.

In one example, the program instructions may be part of an installation package that when installed can be executed by processor 310 to implement a computing device that migrates virtual machines. In this case, machine-readable storage medium 320 may be a portable medium such as a floppy disk, CD, DVD, or flash drive or a memory maintained by a server from which the installation package can be downloaded and installed. In another example, the program instructions may be part of an application or applications already installed. Here, machine-readable storage medium 320 may include a hard disk, optical disk, tapes, solid state drives, RAM, ROM, EEPROM, or the like.

Processor 310 may be at least one central processing unit (CPU), microprocessor, and/or other hardware device suitable for retrieval and execution of instructions stored in machine-readable storage medium 320. Processor 310 may fetch, decode, and execute program instructions 330-340, and/or other instructions. As an alternative or in addition to retrieving and executing instructions, processor 310 may include at least one electronic circuit comprising a number of electronic components for performing the functionality of at least one of instructions 330-340, and/or other instructions.

FIG. 4 is a flow diagram depicting an example method 400 for migrating virtual machines. The various processing blocks and/or data flows depicted in FIG. 4 (and in the other drawing figures such as FIGS. 5 and 6) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, the method of FIG. 4 as illustrated (and described in greater detail below) is meant be an example and, as such, should not be viewed as limiting. The method of FIG. 4 may be implemented in the form of executable instructions stored on a machine-readable storage medium, such as storage medium 320, and/or in the form of electronic circuitry.

In an operation 400, a target hypervisor of a target device may determine whether bandwidth exists on the target device to migrate a source set of virtual machines from a source device. For example, the target device 150 (and/or the bandwidth determination engine 230, the bandwidth determination instructions 330, or other resource of the target device 150) may determine whether bandwidth exists. The target device 150 may determine whether bandwidth exists in a manner similar or the same as that described above in relation to the execution of the bandwidth determination engine 230, the bandwidth determination instructions 330, and/or other resource of the target device 150.

In some examples, operation 400 may comprise operations 410 and 420

In an operation 410, the target hypervisor may determine whether a source total amount of bandwidth related to the source set of virtual machines is less than an available target total amount of free bandwidth on a target set of host bus adaptors. For example, the target device 150 (and/or the bandwidth comparison engine 231, the bandwidth comparison instructions 331, or other resource of the target device 150) may determine whether the source total amount of bandwidth is less than the target total amount of bandwidth. The target device 150 may determine whether the source total amount of bandwidth is less than the target total amount of bandwidth in a manner similar or the same as that described above in relation to the execution of the bandwidth comparison engine 231, the bandwidth comparison instructions 331, and/or other resource of the target device 150.

In an operation 420, the target hypervisor may, responsive to determining that the source total amount of bandwidth is less than the available target total amount of bandwidth, move a first target virtual host bus adaptor of the target set of virtual host bus adaptors across the target set of host bus adaptors to make available the source total amount of bandwidth to migrate the source set of virtual machines. For example, the target device 150 (and/or the virtual host bus adaptors engine 232, the virtual host bus adaptors instructions 332, or other resource of the target device 150) may move the first target virtual host bus adaptor. The target device 150 may move the first target virtual host bus adaptor in a manner similar or the same as that described above in relation to the execution of the virtual host bus adaptors engine 232, the virtual host bus adaptors instructions 332, and/or other resource of the target device 150.

In an operation 430, the target hypervisor may migrate the source set of virtual machines to the target device responsive to determining that the target total amount of bandwidth exists. For example, the target device 150 (and/or the migration engine 140, the migration instructions 340, or other resource of the target device 150) may migrate the source set of virtual machines to the target device. The target device 150 may migrate the source set of virtual machines to the target device in a manner similar or the same as that described above in relation to the execution of the migration engine 140, the migration instructions 340, and/or other resource of the target device 150.

FIG. 5 is a flow diagram depicting an example method for migrating virtual machines. The method of FIG. 5 as illustrated (and described in greater detail below) is meant to be an example and, as such, should not be viewed as limiting. The method of FIG. 5 may be implemented in the form of executable instructions stored on a machine-readable storage medium, such as storage medium 320, and/or in the form of electronic circuitry.

In an operation 500, a determination may be made as to whether a corresponding amount of bandwidth exists on each of a corresponding target set of host bus adaptors for a one-to-one migration of the source set of virtual machines to the corresponding target set of host bus adaptors. For example, the target device 150 (and/or the bandwidth comparison engine 231, the bandwidth comparison instructions 331, or other resource of the target device 150) may determine whether bandwidth for a one-to-one migration exists. The target device 150 may determine whether bandwidth for a one-to-one migration exists in a manner similar or the same as that described above in relation to the execution of the bandwidth comparison engine 231, the bandwidth comparison instructions 331, and/or other resource of the target device 150.

In an operation 510, the one-to-one migration may be performed responsive to determining that the bandwidth exists for the one-to-one migration. For example, the target device 150 (and/or the bandwidth comparison engine 231, the bandwidth comparison instructions 331, or other resource of the target device 150) may perform the one-to-one migration. The target device 150 may perform the one-to-one migration in a manner similar or the same as that described above in relation to the execution of the bandwidth comparison engine 231, the bandwidth comparison instructions 331, and/or other resource of the target device 150.

In an operation 520, a determination may be made as to whether the source total amount of bandwidth is less than the available target total amount of bandwidth responsive to determining that the corresponding amount of bandwidth does not exist for the one-to-one migration. For example, the target device 150 (and/or the bandwidth comparison engine 231, the bandwidth comparison instructions 331, or other resource of the target device 150) may determine that the source total amount of bandwidth is less than the available target total amount of bandwidth. The target device 150 may determine that the source total amount of bandwidth is less than the available target total amount of bandwidth in a manner similar or the same as that described above in relation to the execution of the bandwidth comparison engine 231, the bandwidth comparison instructions 331, and/or other resource of the target device 150.

The foregoing disclosure describes a number of example implementations for migrating virtual machines. The disclosed examples may include systems, devices, computer-readable storage media, and methods for migrating virtual machines. For purposes of explanation, certain examples are described with reference to the components illustrated in FIGS. 1-5. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 4-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order.

Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for migrating virtual machines, the method comprising:
   making bandwidth available at a set of host bus adaptors of a source device and a set of host bus adaptors of a target device in a one to one proportion, the target device having at least two sets of host bus adaptors, to migrate a source set of virtual machines from the source device to the target device by:
   determining a source total amount of bandwidth of a source set of one or more source host bus adaptors associated with the source set of virtual machines at the source device;
   determining an available target total amount of bandwidth of associated with a first target set of one or more target host bus adaptors at the target device that is needed for migration of the source set of virtual machines, wherein each target host bus adaptor of the first target set is allocated one or more target virtual host bus adaptors that are each associated with a portion of the available target total amount of bandwidth;
   determining that the source total amount of bandwidth is less than the available target total amount of bandwidth by comparing the source total amount of bandwidth with the available target total amount of bandwidth; and
   reallocating one or more target virtual host bus adaptors from one or more target host bus adaptors of the first target set to a second target set of one or more target host bus adaptors of the target device to reduce the available target total amount of bandwidth of the first target set to that of the source total amount of bandwidth of the source set to make bandwidth available in the one to one proportion for migration of the source set of virtual machines; and
   migrating the source set of virtual machines to the target device using the source set and the first target set after the source total amount of bandwidth has been made available in the one to one proportion.

2. The method of claim 1, wherein moving the first target virtual host bus adaptor comprises:
   determining an allocation of the target set of virtual host bus adaptors that makes available a respective amount of bandwidth on the target set of host bus adaptors for each of the source set of virtual machines; and
   moving a subset of the target set of virtual host bus adaptors across the target set of host bus adaptors in accordance with the determined allocation.

3. The method of claim 2, further comprising:
   creating a new virtual host bus adaptor on a first target host bus adaptor of the target set of host bus adaptors to make available a first amount of bandwidth for a first source virtual machine of the source set of virtual machines; and
   associating the first source virtual machine to the new virtual host bus adaptor.

4. The method of claim 3, further comprising:
   moving a second target virtual host bus adaptor to both the first target host bus adaptor and to a second target host bus adaptor of the set of target host bus adaptors.

5. The method of claim 1, further comprising:
   determining whether a corresponding amount of bandwidth exists on each of a corresponding target set of host bus adaptors for a migration of the source set of virtual machines; and
   determining that the source total amount of bandwidth is less than the available target total amount of bandwidth responsive to determining that the corresponding amount of bandwidth does not exist for the migration.

6. The method of claim 5, further comprising:
   performing the migration of the source set of virtual machines responsive to determining that the bandwidth exists for the one-to-one migration of the source set of virtual machines.

7. The method of claim 1, wherein determining whether the source total amount of bandwidth is less than the available target total amount of bandwidth on the target set of host bus adaptors comprises:
   accessing, from the target hypervisor of the target device, information about stored associations between the target set of virtual host bus adaptors and the target set of host bus adaptors;
   determining, based on the accessed information, the available target total amount of bandwidth on the target set of host bus adaptors.

8. The method of claim 1, further comprising:
   determining that the source total amount of bandwidth is greater than or equal to the available target total amount of bandwidth, and providing information indicating that the migration will fail.

9. A non-transitory machine-readable storage medium comprising instructions executable by a physical processor of a computing device for migrating virtual machines, the machine-readable storage medium comprising:
   instructions to make bandwidth available at a set of host bus adaptors of a source device and a set of host bus adaptors of a target device in a one to one proportion, the target device having at least two sets of host bus adaptors to migrate a source set of virtual machines from the source device to the target device that, when executed by the processor, causes the processor to:
   determine a source total amount of bandwidth of a source set of one or more source host bus adaptors associated with the source set of virtual machines at the source device:
   determine an available target total amount of bandwidth of associated with a first target set of one or more target host bus adaptors at the target device that is needed for migration of the source set of virtual machines, wherein each target host bus adaptor of the first target set is allocated one or more target virtual host bus adaptors that are each associated with a portion of the available target total amount of bandwidth;

determine that the source total amount of bandwidth is less than the available target total amount of bandwidth by comparing the source total amount of bandwidth with the available target total amount of bandwidth; and reallocate one or more target virtual host bus adaptors from one or more target host bus adaptors of the first target set to a second target set of one or more target host bus adaptors of the target device to reduce the available target total amount of bandwidth of the first target set to that of the source total amount of bandwidth of the source set to make bandwidth available in the one to one proportion for migration of the source set of virtual machines; and migrate the source set of virtual machines to the target device using the source set and the first target set after the source total amount of bandwidth has been made available in the one to one proportion.

10. The non-transitory machine-readable storage medium of claim 9, further comprising:

instructions to move a subset of the target set of virtual host bus adaptors across the target set of host bus adaptors in accordance with the determined allocation.

11. The non-transitory machine-readable storage medium of claim 10, further comprising:

instructions to create a new virtual host bus adaptor on a first target host bus adaptor; and instructions to migrate the first source virtual machine to the new virtual host bus adaptor.

12. The non-transitory machine-readable storage medium of claim 9, further comprising:

instructions to determine whether a corresponding amount of bandwidth exists on each of a corresponding target set of host bus adaptors for a migration of the source set of virtual machines to the corresponding target set of host bus adaptors;

instructions to perform the migration responsive to determining that the bandwidth exists for the one-to-one migration; and instructions to determine that the source total amount of bandwidth is less than the available target total amount of bandwidth responsive to determining that the corresponding amount of bandwidth does not exist for the one-to-one migration.

13. The non-transitory machine-readable storage medium of claim 9, wherein the instructions to determine whether the source total amount of bandwidth is less than the available target total amount of bandwidth comprise:

instructions to access information about stored associations between the target set of virtual host bus adaptors and the target set of host bus adaptors;

instructions to determine, based on the accessed information, the available target total amount of bandwidth on the target set of host bus adaptors.

14. The non-transitory machine-readable storage medium of claim 9, further comprising:

instructions to, responsive to determining that the source total amount of bandwidth is greater than or equal to the available target total amount of bandwidth, provide information indicating that the migration will fail.

15. A system for migrating virtual machines, the system comprising:

a physical processor that implements machine readable instructions that cause the system to:

make bandwidth available at a set of host bus adaptors of a source device and a set of host bus adaptors of a target device in a one to one proportion, the target device having at least two sets of host bus adaptors, to migrate a source set of virtual machines from the source device to the target device by causing the processor to:

determine a source total amount of bandwidth of a source set of one or more source host bus adaptors associated with the source set of virtual machines at the source device;

determine an available target total amount of bandwidth of associated with a first target set of one or more target host bus adaptors at the target device that is needed for migration of the source set of virtual machines, wherein each target host bus adaptor of the first target set is allocated one or more target virtual host bus adaptors that are each associated with a portion of the available target total amount of bandwidth;

determine that the source total amount of bandwidth is less than the available target total amount of bandwidth by comparing the source total amount of bandwidth with the available target total amount of bandwidth; and reallocate one or more target virtual host bus adaptors from one or more target host bus adaptors of the first target set to a second target set of one or more target host bus adaptors of the target device to reduce the available target total amount of bandwidth of the first target set to that of the source total amount of bandwidth of the source set to make bandwidth available in the one to one proportion for migration of the source set of virtual machines; and migrate the source set of virtual machines to the target device using the source set and the first target set after the source total amount of bandwidth has been made available in the one to one proportion.

16. The system of claim 15, wherein the physical processor implements machine readable instructions that cause the system to:

create a new virtual host bus adaptor on the first target host bus adaptor; and associate the first source virtual machine to the new virtual host bus adaptor.

17. The system of claim 16, wherein the physical processor implements machine readable instructions that cause the system to:

move a second target virtual host bus adaptor to the first target host bus adaptor and to a second target host bus adaptor of the set of target host bus adaptors.

18. The system of claim 15, wherein the physical processor implements machine readable instructions that cause the system to:

determine that the source total amount of bandwidth is less than the available target total amount of bandwidth responsive to determining that the corresponding amount of bandwidth does not exist for a migration.

19. The system of claim 15, wherein the physical processor implements machine readable instructions that cause the system to determine whether the source total amount of bandwidth is less than the available target total amount of bandwidth on the target set of host bus adaptors by:

accessing information about stored associations between the target set of virtual host bus adaptors and the target set of host bus adaptors; and determining, based on the accessed information, the available target total amount of bandwidth on the target set of host bus adaptors.

20. The system of claim 15, wherein the physical processor implements machine readable instructions that cause the system to:

responsive to determining that the source total amount of bandwidth is greater than or equal to the available target total amount of bandwidth, provide information indicating that the migration will fail.

\* \* \* \* \*